United States Patent [19]
Yoshimi et al.

[11] Patent Number: 6,020,428
[45] Date of Patent: Feb. 1, 2000

[54] RUBBER-MODIFIED STYRENCI RESIN COMPOSITION AND MOLDED ARTICLE THEREOF

[75] Inventors: Shuji Yoshimi; Hayato Kihara; Takahiro Ishii, all of Chiba, Japan

[73] Assignee: Sumitomo Chemical Company, Limited, Osaka, Japan

[21] Appl. No.: 08/656,014

[22] Filed: May 24, 1996

Related U.S. Application Data

[63] Continuation-in-part of application No. PCT/JP95/01943, Sep. 26, 1995.

[30] Foreign Application Priority Data

Sep. 26, 1994 [JP] Japan ..................................... 6-229638

[51] Int. Cl.⁷ .................................................... C08L 25/04
[52] U.S. Cl. ................................. 525/80; 525/83; 525/84; 525/96; 525/100
[58] Field of Search ................................ 525/83, 84, 96, 525/80, 100

[56] References Cited

U.S. PATENT DOCUMENTS

| | | | |
|---|---|---|---|
| 4,476,266 | 10/1984 | Maeda et al. | 525/128 |
| 4,739,001 | 4/1988 | Okamoto et al. | |
| 5,231,142 | 7/1993 | Tsubokura et al. | 525/316 |
| 5,281,665 | 1/1994 | Fukui et al. | 525/84 |

FOREIGN PATENT DOCUMENTS

| | | |
|---|---|---|
| 0103456 | 8/1979 | Japan . |
| 0147841 | 11/1981 | Japan . |
| 0053549 | 3/1982 | Japan . |
| 58-160336 | 9/1983 | Japan . |
| 1108654 | 5/1986 | Japan . |
| 62-277458 | 12/1987 | Japan . |
| 2-38437 | 2/1990 | Japan . |
| 3-220255 | 9/1991 | Japan . |
| 5-271363 | 10/1993 | Japan . |
| 5-320272 | 12/1993 | Japan . |
| 5-339463 | 12/1993 | Japan . |
| 6-228357 | 8/1994 | Japan . |

*Primary Examiner*—Jeffrey Mullis
*Attorney, Agent, or Firm*—Birch, Stewart, Kolasch & Birch, LLP

[57] ABSTRACT

A rubber-modified styrenic resin composition comprising (A) 100 wt. parts of a rubber-modified styrenic resin which contains 10 to 35 wt. % of soft component particles having an average particle size of 0.1 to 0.5 $\mu$m, where said soft component particles have a single occlusion structure comprising a core part which consists of a single continuous phase of a styrenic resin and a shell part which comprises a rubber polymer and occludes said core part, and (B) 0.1 to 10 wt. parts of a polymer having a solubility parameter (SP) of 8.45 to 8.70 and having no aromatic vinyl compound unit therein. This composition has excellent plane impact strength and gloss properties as well as moldability and other physical properties, and satisfies properties required for exterior materials, wrapping materials and molded foam articles.

11 Claims, No Drawings

RUBBER-MODIFIED STYRENCI RESIN COMPOSITION AND MOLDED ARTICLE THEREOF

This application is a continuation-in-part of PCT international application No. PCT/JP95/01493 which has an international filing date of Sep. 26, 1995 which designated the United States, the entire contents of which are hereby incorporated by reference.

FIELD OF THE INVENTION

The present invention relates to a rubber-modified styrenic resin composition which provides a molded article which is excellent in plane impact strength and gloss, and a molded article thereof. In particular, the present invention relates to a rubber-modified styrenic resin composition which provides a molded article plane impact strength of which is greatly increased, and gloss of which is excellent by the addition of a specific polymer to a specific rubber-modified styrenic resin, and a molded article thereof.

DESCRIPTION OF CONVENTIONAL ART

In the fields of office automation equipments and household appliances, good balance of various properties such as processability in a molding process, accuracy of finished sizes of processed products, mechanical properties (e.g. tensile strength, flexural strength, etc.), heat resistance, and so on is required. In particular, when a resin is used as an exterior material, further improvement of gloss and plane impact resistance is required. In these years, such requirement reaches to a very high level. When the resin is used as a wrapping material, high level plane impact strength and appearance are required. When the resin is used as a cushioning material, one of the essential properties which the resin should have is good shock absorbability. However, the rubber-modified styrenic resin does not necessarily satisfy all the above requirements.

As a method for improving the impact resistance of the rubber-modified styrenic resin, there is known the addition of specific amounts of an organic polysiloxane and an ethylene-unsaturated carboxylate copolymer to the rubber-modified styrenic resin. However, the dispersed rubber particles have an average particle size of 0.1 to 2.5 μm, and the plane impact strength of the composition is insufficient.

SUMMARY OF THE INVENTION

An object of the present invention is to solve the above problems and provide a rubber-modified styrenic resin composition excellent in the properties which are required for the exterior materials, wrapping materials and molded foam articles, for example, excellent in plane impact strength and gloss, as well as molding properties and other physical properties.

According to a first aspect of the present invention, there is provided a rubber-modified styrenic resin composition comprising (A) 100 wt. parts of a rubber-modified styrenic resin which contains 10 to 35 wt. % of soft component particles having an average particle size of 0.1 to 0.5 μm, where said soft component particles have a single occlusion structure comprising a core part which consists of a single continuous phase of a styrenic resin and a shell part which comprises a rubber polymer and occludes said core part, and (B) 0.1 to 10 wt. parts of a polymer having a solubility parameter (SP) of 8.45 to 8.70 and comprising no aromatic vinyl compound unit therein.

According to a second aspect of the present invention, there is provided an injection molded article, an extrusion molded article or a molded foam article comprising the above rubber-modified styrenic resin composition.

DETAILED DESCRIPTION OF THE INVENTION

The rubber-modified styrenic resin (A) used in the present invention may be a rubber-modified styrenic resin which is obtained by polymerizing at least one styrenic monomer, or at least one styrenic monomer and a compound copolymerizable therewith in the presence of a rubber polymer.

Examples of the styrenic monomer which is used as a raw material of the rubber-modified styrenic resin (A) used in the present invention are styrene,α-alkyl-substituted styrenes such as α-methylstyrene, nucleus substituted alkylstyrenes such as p-methylstyrene, and so on. Examples of the compound copolymerizable with the styrenic monomer are vinyl monomers such as acrylonitrile, methacrylonitrile, methacrylic acid, methyl methacrylate, etc., maleic anhydride, maleimide, nucleus substituted maleimide, and so on.

As the rubber polymer, polybutadiene, styrene-butadiene copolymers, ethylene-propylene-non-conjugated diene terpolymers, and so on are used. Among them, polybutadiene and the styrene-butadiene copolymers are preferred. As the polybutadiene, high-cis polybutadiene having a high cis-structure content and low-cis polybutadiene having a low cis-structure content are both used.

A content of the soft component particles in the rubber-modified styrenic resin (A) is from 10 to 35 wt. %. When this particle content is less than 10 wt. %, the plane impact strength is not sufficiently improved, while it exceeds 35 wt. %, properties other than the plane impact strength, for example, stiffness, heat resistance, etc. are deteriorated unpreferably.

A content of the soft component particles in the rubber-modified styrenic resin (A) is measured as follows:

About 0.5 g of a sample of the rubber-modified styrenic resin is weighed (weight: $W_1$), and the sample is dissolved in a mixed solvent of methyl ethyl ketone and methanol (a volume ratio of 10/1) (50 ml) at room temperature (about 23° C.). Then, undissolved components are isolated by centrifugation, dried, and then weighed (weight: $W_2$). A content of the soft component particles in the rubber-modified styrenic resin is calculated by the equation:

$$(W_2/W_1) \times 100 \ (\%).$$

An average particle size of the soft component particles are from 0.1 to 0.5 μm, preferably from 0.1 to 0.3 μm. When the average particle size is less than 0.1 μm, the plane impact strength of the molded article is not sufficiently improved, while when it exceeds 0.5 μm, the appearance of the molded article such as gloss is deteriorated unpreferably.

Herein, the average particle size is defined as follows:

A very thin section of the rubber-modified styrenic resin is prepared, and its transmission electron microscopic photograph is taken. Particle sizes of the soft component particles in the photograph are measured and the average particle size is calculated by the following equation:

$$\text{Average particle size} = \Sigma n_i D_i^2 / \Sigma n_i D_i$$

wherein $D_i$ is a particle size, and $n_i$ is the number of the particles having the particle size $D_i$.

In the present invention, the soft component particles in the rubber-modified styrenic resin (A) should have a single occlusion structure comprising a core part which consists of a single continuous phase of a styrenic resin and a shell part which comprises a rubber polymer and occludes said core part, which structure may be referred to as a core-shell structure or a capsule structure. The gloss is deteriorated when the particles have other structure, for example, a salami-like structure in which plural minute particles of the styrenic resin are dispersed in a continuous phase of the rubbery polymer. The structure of the soft component particles is observed with a transmission electron microscope as in the above measurement of the average particle size.

The synthesis of the rubber-modified styrenic resin (A) in which the structure of the soft component particles is the single occlusion structure is described in, for example, Die Angewandte Macromolekulare Chemie, 58/59, 175–198 (1977), and such resin can be synthesized by polymerizing a styrenic monomer in the presence of a styrene-butadiene block copolymer having a styrene content of 15 to 65 wt. %.

According to the present invention, the composition contains 0.1 to 10 wt. parts of a polymer (B) having a solubility parameter (SP) of 8.45 to 8.70 and comprising no aromatic vinyl compound unit therein per 100 wt. parts of the rubber-modified styrenic resin (A). When the content of the polymer (B) is less than 0.1 wt. part, the plane impact strength is not sufficiently improved, while when it exceeds 10 wt. parts, other physical properties such as heat resistance are deteriorated unpreferably.

The content of the polymer (B) in the composition of the present invention can be obtained by preparing a very thin section of the composition, taking a transmission electron microscopic photograph of the slice piece, calculating an a percentage of areas of the polymer (B) in the whole photographic area, and converting the percentage to the content of the polymer (B). Alternatively, a method using a spectrometer such as a NMR spectrometer or an IR spectrometer and calculating the content of the polymer (B) from an absorption peak, or a method comprising fractionating the polymers with a solvent may be used.

The solubility parameter (SP) of the polymer (B) used in the present invention is from 8.45 to 8.70. When the solubility parameter is larger than 8.45 or smaller than 8.70, the improvement of the plane impact strength is insufficient.

Herein, the solubility parameter is defined as an attraction force between molecules according to the Hildebrand-Scatchard theory. This theory is described in "The Solubility of Nonelectrolytes", Third Edition, Reinhold Publishing Corp., New York, 1949, and Chem. Rev., 8, 321 (1931), as well as common textbooks in the polymer chemistry. The solubility parameter can be experimentally measured by a viscosity method or a swelling method, or calculated from molecular structures, and values of the solubility parameter differ slightly depending on the methods. Herein, there is used a method for calculating the solubility parameter from the molecular structures which is proposed by Small. This method and theory are described in detail in J. Appl. Chem., 3, 71–80 (1953), the disclosure of which is hereby incorporated by reference. According to this literature, the solubility parameter is calculated by the following equation:

$$SP = \frac{\sum F_i}{V} = \frac{\rho \times \sum F_i}{M}$$

wherein $F_i$ is a molar attracting force of a structural group which constitutes a molecule such as an atom, an atomic group or a bond type, V is a molar volume, p is a density, and M is a molecular weight of a compound, or a molecular weight of one repeating unit (namely a monomer) in the case of a polymer molecule. As the $F_i$ values, those of Small described in the above two literatures are used. Each of $\rho$, $\Sigma F_i$ and M of a copolymer is calculated as a sum of a product of $\rho$, $\Sigma F_i$ or M of a homopolymer of each monomer and a molar percentage of the respective monomer.

The polymer (B) used in the present invention is a polymer which has no aromatic vinyl compound unit therein. When the resin composition contains a polymer which comprises an aromatic vinyl compound unit, the plane impact strength is low.

Examples of the aromatic vinyl compound are styrene, α-alkyl-substituted styrenes such as α-methylstyrene, nucleus substituted alkylstyrenes such as p-methylstyrene, and so on.

Examples of the polymer (B) having the solubility parameter of 8.45 to 8.70 are copolymers comprising ethylene and at least one vinyl monomer selected from the group consisting of unsaturated carboxylic acids, unsaturated carboxylates and vinyl acetate. Specific examples of such copolymer are ethylene-unsaturated carboxylic acid copolymers, ethylene-unsaturated carboxylate copolymers, ethylene-vinyl acetate copolymers, ethylene-unsaturated carboxylate-vinyl acetate terpolymers, copolymers comprising ethylene and at least two unsaturated carboxylates, and so on.

Examples of the unsaturated carboxylic acid are acrylic acid, methacrylic acid, etc. Examples of the unsaturated carboxylate are ethyl acrylate, methyl acrylate, 2-ethylhexyl acrylate, stearyl acrylate, glycidyl acrylate, methyl methacrylate, ethyl methacrylate, 2-ethylhexyl methacrylate, stearyl methacrylate, glycidyl methacrylate, etc.

Preferred examples of the copolymer comprising ethylene and at least one vinyl monomer selected from the group consisting of unsaturated carboxylic acids, unsaturated carboxylates and vinyl acetate which are used in the present invention are ethylene-acrylic acid copolymers, ethylene methacrylic acid copolymers, ethylene-methyl methacrylate copolymers, ethylene-ethyl methacrylate copolymers, ethylene-ethyl acrylate copolymers, ethylene-methyl acrylate copolymers, ethylene-vinyl acetate copolymers, ethylene-methyl acrylate-glycidyl methacrylate copolymers, ethylene-methyl methacrylate-glycidyl methacrylate copolymers, ethylene-vinyl acetate-glycidyl methacrylate copolymers, etc.

Percentages of the above vinyl monomer and ethylene in the copolymer may be arbitrarily selected in a range in which the copolymer having the solubility parameter (SP) of 8.45 to 8.70 is obtained. A percentage of the above vinyl monomer in the copolymer is preferably from 5 to 60 wt. %. There is no limitation on a bonding type between the vinyl monomer and ethylene (e.g. random, block, alternating, etc.). A melt flow rate of the copolymer (measured according to JIS K7210 at 190° C. under a load of 2.16 kgf) is not limited, and preferably from 1 to 500 g/10 min.

When the composition of the present invention comprises 0.01 to 0.5 wt. part of an organic polysiloxane per 100 wt. parts of the rubber-modified styrenic resin (A), the plane impact strength is further improved. When the amount of the organic polysiloxane exceeds 0.5 wt. part, the plane impact strength will not increase further.

Herein, the organic polysiloxane is intended to mean a compound of the following formula:

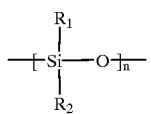

wherein $R_1$ and $R_2$ are the same or different and represent an alkyl group, an aryl group or a phenyl group, and n is an average degree of polymerization and a number of 10 to 1500. The polysiloxane may have an epoxy group, an amino group, a carboxyl group, a vinyl group, a hydroxyl group, a fluorine atom or an alkoxy group at its terminal or intermediate molecular chain.

A structure of the organic polysiloxane to be used in the present invention may be a homopolymer, a random copolymer, a block copolymer or a graft polymer, or the polysiloxane may be one in which a part of the organic groups are substituted by a hydroxyl group, an alkoxy group, a hydroxyalkyl group, etc. Further, two or more organic polysiloxanes may be used in combination.

A kind of the organic polysiloxane to be used in the present invention is not limited. Specific examples thereof are polydimethylsiloxane, polymethylphenylsiloxane, polydiphenylsiloxane, and so on. A viscosity of the organic polysiloxane is not critical. When the viscosity is less than 10 cSt, volatility is too large, while it is larger than 100,000 cSt, it may be difficult to disperse the organic polysiloxane in the composition homogeneously.

In general, one having the viscosity in the range from 10 to 100,000 cSt at 30° C. is preferred because of easy handling.

A method for the addition of the organic polysiloxane is not limited. For example, the organic polysiloxane can be added in the course of the preparation of the rubber-modified styrenic resin (A), for example, the organic polysiloxane can be beforehand added to the monomer in the polymerization step or added to the polymerization system in the course of polymerization. Alternatively, the organic polysiloxane may be added when the components (A) and (B) are mixed, or when the composition is molded. These methods may be employed independently or in combination.

To prepare the rubber-modified styrenic resin composition of the present invention, determined amounts of the components are dry blended using a mixing apparatus such as a Henschel mixer, a tumbling mixer, and so on, or heated and kneaded at a temperature of 180 to 260° C. using a kneading apparatus such as a single or twin screw extruder, a Banbury mixer, and so on, and then the mixture is pelletized. If necessary, additives such as an antioxidant, a heat stabilizer, a UV-light absorber, a lubricant, an antistatic agent, a mineral oil, and so on may be added to the composition.

The injection molded article comprising the rubber-modified styrenic resin composition of the present invention can be produced using a conventionally used injection molding apparatus.

The extrusion molded article comprising the rubber-modified styrenic resin composition of the present invention can be produced using a conventionally used extrusion molding apparatus.

There is no specific limitation on a method for the production of the extrusion molded article by extruding the rubber-modified styrenic resin composition of the present invention. There are exemplified a method comprising melting the resin composition in an extruder and extruding it through a T-die, and a method comprising extruding the molten resin composition in a sheet form from the extruder and then biaxially stretching it by a tenter or an inflation method.

There is no specific limitation on a method for the production of a foam article by foaming the rubber-modified styrenic resin composition. There are exemplified a method comprising melt kneading the rubber-modified styrenic resin composition and a decomposable foaming agent by an extruder and foaming the mixture, a method comprising melting the rubber-modified styrenic resin composition by the extruder, adding a vaporizable foaming agent directly to the composition under pressure in a middle part of a cylinder, kneading them and foaming the mixture, a method comprising impregnating small pellets or beads of the rubber-modified styrenic resin composition with a vaporizable foaming agent in the extruder or an aqueous suspension and foaming the impregnated pellets or beads with steam.

Examples of the decomposable foaming agent are azodicarbonamide, trihydrazinotriazine, benzenesulfonylsemicarbazide, etc. Examples of the vaporizable foaming agent are propane, n-butane, isobutane, n-pentane, isopentane, hexane, heptane, Freons® etc.

The rubber-modified styrenic resin composition of the present invention finds its applications in an injection molded article field, an extruded sheet field and a foam article filed, in which the properties of the composition are best used. That is, as the injection molded article or extrusion molded article, there are exemplified housings of electronic equipments, business appliances, telephones, office automation equipments, etc. and wrapping materials such as food containers. The foam material is used in the production of wrapping containers by vacuum shaping or pressure shaping. In addition, the rubber-modified styrenic resin composition of the present invention is preferably used as a cushioning material for precision machines, a heat insulator, a construction material, and so on.

EXAMPLES

The present invention will be illustrated by the following examples, which do not limit the scope of the present invention in any way.

The measurements and evaluations are carried out as follows. The properties other than those described below were measured by the above described methods.

(1) Flexural modulus (stiffness)

Flexural modulus was measured according to JIS K7203.

(2) Vicat softening point (heat resistance)

A Vicat softening point was measured according to JIS K7206, Method B.

(3) DuPont type impact strength (plane impact strength)

A plate having a thickness of 2 mm was injection molded. Using an apparatus having a dart tip diameter of ⅛ inch R and a receiving diameter of 3/16 R, an energy at 50% destruction was measured at 23° C. As a molding apparatus, Toshiba IS-150E was used, a mold temperature was 40° C., and sample sizes were 150× 90×2 mm. With a resin sheet, using an apparatus having a dart tip diameter of ⅛ inch R and a receiving diameter of 3/16 R, an energy at 50% destruction was measured at 23° C.

(4) Failing weight impact (plane impact strength)

A plate having a thickness of 2 mm was injection molded. Using a "falling weight graphic impact tester" of TOYO SEIKI MANUFACTURING Co., Ltd., a weight of 7.5 kg was spontaneously fallen from a height of 80 cm on a surface of the plate to completely break or pass through the plate by a striker which was attached to a lower end of the weight. Then, an energy required for cracking the plate was measured. As a molding apparatus, Toshiba IS-150E was used, a mold temperature was 40° C., and sample sizes were 150×90×2 mm.

(5) Surface gloss (surface appearance)

A plate having a thickness of 2 mm was injection molded. Gloss in a central area of the plate was measured by the method for measuring 45 degrees mirror surface gloss of JIS K7105. As a molding apparatus, Toshiba IS-150E was used, a mold temperature was 40° C., and sample sizes were 150×90×2 mm. With the resin sheet, the surface gloss was measured in the same manner.

(6) Tensile modulus (stiffness)

Using a resin sheet, tensile modulus was measured according to JIS K7113.

Examples 1–10 and Comparative Examples 1–9

Components shown in Tables 1–4 were molten, kneaded and pelletized by an extruder having a cylinder diameter of 40 mm at 220° C. to obtain pellets. The obtained pellets were injection molded to form a test piece or a plate, and subjected to the above measurements of the physical properties.

Examples 11 and 12 and Comparative Example 10

Components in Table 5 were dry blended and extrusion molded using a sheet processing machine having a cylinder diameter of 65 mm (V65-S1000 manufactured by TANABE PLASTICS MACHINE) at a resin temperature of 240° C. to obtain a resin sheet having a thickness of 1.2 to 1.5 mm. Physical properties of the sheet were measured.

The used rubber-modified styrenic resin (A) was synthesized by a continuous bulk polymerization method as follows:

Component (A) used in Examples 1–12 and Comparative Examples 1–6 and 10

In a polymerization vessel equipped with a stirrer, a liquid mixture of 80 wt. % of styrene, 12 wt % of a styrene-butadiene block copolymer (styrene content of 40 wt. %), 5 wt. % of ethylbenzene and 3 wt. % of a mineral oil was supplied and polymerized at a temperature of 140° C. at a stirring rate of 35 rpm to a conversion of 37.5%. Subsequently, the resulting liquid mixture was transferred to a liquid filling type polymerization vessel and polymerized to a conversion of 77%. A content was transferred to an evacuation vessel kept at 240° C. and volatile components were evaporated off. Then, the obtained polymer was passed through a melt extruder and a pelletizer to obtain a pellet form rubber-modified styrenic resin.

Component (A) used in Comparative Example 7

In a polymerization vessel equipped with a stirrer, a liquid mixture of 89.8 wt. % of styrene, 5.6 wt % of polybutadiene, 3.6 wt. % of ethylbenzene and 1 wt. % of a mineral oil was supplied and polymerized at a temperature of 140° C. at a stirring rate of 60 rpm to a conversion of 23%. Subsequently, the resulting liquid mixture was transferred to a liquid filling type polymerization vessel and polymerized to a conversion of 70%. A content was transferred to an evacuation vessel kept at 240° C. and volatile components were evaporated off. Then, the obtained polymer was passed through a melt extruder and a pelletizer to obtain a pellet form rubber-modified styrenic resin.

Component (A) used in Comparative Examples 8 and 9

In a polymerization vessel equipped with a stirrer, a liquid mixture of 87.4 wt. % of styrene, 5.4 wt % of polybutadiene, 5 wt. % of ethylbenzene and 2.2 wt. % of a mineral oil was supplied and polymerized at a temperature of 140° C. at a stirring rate of 35 rpm to a conversion of 20%. Subsequently, the resulting liquid mixture was transferred to a liquid filling type polymerization vessel and polymerized to a conversion of 70%. A content was transferred to an evacuation vessel kept at 240° C. and volatile components were evaporated off. Then, the obtained polymer was passed through a melt extruder and a pelletizer to obtain a pellet form rubber-modified styrenic resin.

The used polymers (B) were as follows:

B1: Ethylene-methyl methacrylate copolymer (Trade name "ACRYFT WM 403" manufactured by Sumitomo Chemical Co., Ltd. Methyl methacrylate content: 38 wt. %. Melt flow rate: 15 g/10 min.)

B2: Ethylene-methyl methacrylate copolymer (Trade name "ACRYFT WK 402" manufactured by Sumitomo Chemical Co., Ltd. Methyl methacrylate content: 25 wt. %. Melt flow rate: 20 g/10 min.)

B3: Ethylene-methyl methacrylate copolymer (Trade name "ACRYFT WH 303" manufactured by Sumitomo Chemical Co., Ltd. Methyl methacrylate content: 18 wt. %. Melt flow rate: 7 g/10 min.)

B4: Ethylene-ethyl acrylate copolymer (Ethyl acrylate content: 18 wt. %. Melt flow rate: 7 g/10 min.)

B5: Ethylene-vinyl acetate copolymer (Trade name "SUMITATE RG-11" manufactured by Sumitomo Chemical Co., Ltd. Vinyl acetate content: 41 wt. %. Melt flow rate: 60 g/10 min.)

B6: Ethylene-vinyl acetate copolymer (Trade name "SUMITATE HA-20" manufactured by Sumitomo Chemical Co., Ltd. Vinyl acetate content: 20 wt. %. Melt flow rate: 20 g/10 min.)

B7: Polypropylene (Trade name "NOBLEN AD571" manufactured by Sumitomo Chemical Co., Ltd. Melt flow rate: 0.2 g/10 min.)

B8: Polyethylene (Trade name "SUMIKASENα FZ 103-0" manufactured by Sumitomo Chemical Co., Ltd. Melt flow rate: 0.9 g/10 min.)

B9: Polymethyl methacrylate (Trade name "SUMIPEKS-BMHG" manufactured by Sumitomo Chemical Co., Ltd. Melt flow rate: 0.5 g/10 min.)

B10: Styrene-methyl methacrylate copolymer (Trade name "ESTYRENE MS300" manufactured by SHIN-NITTETSU CHEMICAL INDUSTRIES, LTD. Methyl methacrylate content: 30 wt. %. Melt flow rate: 0.2 g/10 min.)

B11: Styrene-acrylonitrile copolymer (Trade name "SANREX SAN-R" manufactured by MITSUBISHI MONSANTO CHEMICAL Co., Ltd. Acrylonitrile content: 26 wt. %. Melt flow rate: 0.9 g/10 min.)

A melt flow rate was measured according to JIS K7210 at a temperature of 190° C. under a load of 2.16 kgf. Solubility parameters of these polymers (B) are shown in Tables 6 and 7.

As an organic polysiloxane, a silicone oil of TORAY SILICONE, a trade name "SH200" (polydimethylsiloxane, 1000 cSt) was used.

The results indicate the following:

The compositions of Examples satisfying all the conditions of the present invention achieved the excellent results in all the evaluations. The composition of Comparative Example 1 containing no polymer (B) had the very low plane impact strength (the falling weight impact and DuPont type impact strength), and slightly poor gloss. The compositions of Comparative Examples 2 to 4 containing the polymer having the SP outside the defined range as the polymer (B) were poor in plane impact strength. The compositions of Comparative Examples 5 and 6 containing the polymer (B) which comprised the aromatic vinyl compound units and had the SP outside the defined range was poor in plane impact strength. The compositions of Comparative Examples 7 to 9 which had the large particle size and the salami structure were poor in plane impact strength and gloss. The molded sheet of Comparative Example 10 containing no polymer (B) was poor in plane impact strength and gloss.

TABLE 1

|  | C. Ex. 1 | Ex. 1 | Ex. 2 | Ex. 3 | Ex. 4 | Ex. 5 |
|---|---|---|---|---|---|---|
| Composition (wt. parts) |  |  |  |  |  |  |
| (A)*1) | 100 | 100 | 100 | 100 | 100 | 100 |
| (B)*2) | 0 | 1 | 1 | 2 | 4 | 6 |
|  |  | B1 | B1 | B1 | B1 | B1 |
| (C)*3) | 0 | 0 | 0.05 | 0.05 | 0.05 | 0.1 |
| Structure |  |  |  |  |  |  |
| Amount of soft component particles in (A) (wt. %) | 27 | 27 | 27 | 27 | 27 | 27 |
| Particle size of soft component particles in (A) (μm) | 0.18 | 0.18 | 0.18 | 0.18 | 0.18 | 0.18 |
| Structure of soft component particles in (A)*4) | OCC | OCC | OCC | OCC | OCC | OCC |
| Evaluations |  |  |  |  |  |  |
| Flexural moduus (kgf/cm$^2$) | 20200 | 19300 | 19200 | 18900 | 18500 | 17800 |
| DuPont type impact strength (kgf · cm) | 8.5 | 15.6 | 22.6 | 41.5 | 46.5 | 45.0 |
| Falling weight impact crack forming energy (J) | 3.0 | 6.7 | 8.2 | 16.5 | 18.8 | 18.1 |
| Vicat softening point (° C.) | 87.2 | 86.8 | 86.8 | 86.8 | 85.5 | 84.0 |
| Gloss (%) | 103 | 104 | 104 | 104 | 105 | 103 |

TABLE 2

|  | Ex. 6 | Ex. 7 | Ex. 8 | Ex. 9 | Ex. 10 |
|---|---|---|---|---|---|
| Composition (wt. parts) |  |  |  |  |  |
| (A)*1) | 100 | 100 | 100 | 100 | 100 |
| (B)*2) | 4 | 2 | 2 | 4 | 4 |
|  | B2 | B3 | B4 | B5 | B6 |
| (C)*3) | 0.1 | 0.05 | 0.1 | 0.1 | 0.1 |
| Structure |  |  |  |  |  |
| Amount of soft component particles in (A) (wt. %) | 27 | 27 | 27 | 27 | 27 |
| Particle size of soft component particles in (A) (μm) | 0.18 | 0.18 | 0.18 | 0.18 | 0.18 |
| Structure of soft component particles in (A)*4) | OCC | OCC | OCC | OCC | OCC |
| Evaluations |  |  |  |  |  |
| Flexural modulus (kgf/cm$^2$) | 18900 | 18800 | 19000 | 17800 | 18100 |
| DuPont type impact strength (kgf · cm) | 40.0 | 38.2 | 28.3 | 40.8 | 46.3 |
| Falling weight impact crack forming energy (J) | 14.5 | 15.7 | 10.7 | 16.8 | 18.1 |

TABLE 2-continued

|  | Ex. 6 | Ex. 7 | Ex. 8 | Ex. 9 | Ex. 10 |
|---|---|---|---|---|---|
| Vicat softening point (° C.) | 85.5 | 86.6 | 86.5 | 85.1 | 86.5 |
| Gloss (%) | 106 | 105 | 105 | 104 | 103 |

TABLE 3

|  | C. Ex. 2 | C. Ex. 3 | C. Ex. 4 | C. Ex. 5 | C. Ex. 6 |
|---|---|---|---|---|---|
| Composition (wt. parts) |  |  |  |  |  |
| (A)*1) | 100 | 100 | 100 | 100 | 100 |
| (B)*2) | 4 | 4 | 4 | 4 | 4 |
|  | B7 | B8 | B9 | B10 | B11 |
| (C)*3) | 0.1 | 0.1 | 0.1 | 0.1 | 0.1 |
| Structure |  |  |  |  |  |
| Amount of soft component particles in (A) (wt. %) | 27 | 27 | 27 | 27 | 27 |
| Particle size of soft component particles in (A) (μm) | 0.18 | Q18 | 0.18 | 0.18 | 0.18 |
| Structure of soft component particles in (A)*4) | OCC | OCC | OCC | OCC | OCC |
| Evaluations |  |  |  |  |  |
| Flexural modulus (kgf/cm$^2$) | 20000 | 19500 | 20700 | 20500 | 20700 |
| DuPont type impact strength (kgf · cm) | 4.2 | 7.9 | 4.4 | 6.2 | 5.2 |

TABLE 3-continued

|  | C. Ex. 2 | C. Ex. 3 | C. Ex. 4 | C. Ex. 5 | C. Ex. 6 |
|---|---|---|---|---|---|
| Falling weight impact crack forming energy (J) | 1.1 | 4.1 | 1.1 | 3.7 | 2.4 |
| Vicat softening point (° C.) | 87.7 | 86.8 | 88.1 | 87.5 | 87.6 |
| Gloss (%) | 104 | 106 | 105 | 102 | 101 |

TABLE 4

|  | C. Ex. 7 | C. Ex. 8 | C. Ex. 9 |
|---|---|---|---|
| Composition (wt. parts) |  |  |  |
| (A)*1) | 100 | 100 | 100 |
| (B)*2) | 1 B1 | 0 | 4 B1 |
| (C)*3) | 0.05 | 0 | 0.1 |
| Structure |  |  |  |
| Amount of soft component particles in (A) (wt. %) | 15 | 14 | 14 |
| Particle size of soft component particles in (A) ($\mu$m) | 0.8 | 1.8 | 1.8 |
| Structure of soft component particles in (A)*4) | SAL | SAL | SAL |
| Evaluations |  |  |  |
| Flexural modulus (kgf/cm$^2$) | 24500 | 20900 | 19900 |
| DuPont type impact strength (kgf · cm) | 0.5 | 11.0 | 13.5 |
| Falling weight impact crack forming energy (J) | 3.7 | 5.2 | 5.6 |
| Vicat softening point (° C.) | 80.8 | 90.0 | 89.8 |
| Gloss (%) | 101 | 61 | 65 |

TABLE 5

|  | C. Ex. 10 | Ex. 11 | Ex. 12 |
|---|---|---|---|
| Composition (wt. parts) |  |  |  |
| (A)*1) | 100 | 100 | 100 |
| (B)*2) | 0 | 2 B1 | 4 B1 |
| (C)*3) | 0 | 0.05 | 0.05 |
| Structure |  |  |  |
| Amount of soft component particles in (A) (wt. %) | 27 | 27 | 27 |
| Partice size of soft component particles in (A) ($\mu$m) | 0.18 | 0.18 | 0.18 |
| Structure of soft component particles in (A)*4) | OCC | OCC | OCC |
| Evaluations |  |  |  |
| DuPont type impact strength (kgf · cm) | 19.4 | 23.5 | 32.7 |
| Tensile modulus (kgf/cm$^2$) | 10000 | 9400 | 9200 |
| Gloss (%) | 102 | 106 | 105 |

Common Notes for Tables 1 to 5:
*1) (A): Rubber-modified styrenic resin (styrene being used as a styrenic monomer).
*2) (B): Polymers shown in Tables 6 and 7.
*3) (C): An organic polysiloxane.
*4) OCC: single occlusion; SAL: salami-like.

TABLE 6

|  | B1 | B2 | B3 | B4 | B5 | B6 |
|---|---|---|---|---|---|---|
| Density $\rho$ (g/cm$^3$) | 0.96 | 0.94 | 0.94 | 0.93 | 0.97 | 0.94 |
| Molecular weight M of repeating unit | 38.5 | 34.1 | 32.2 | 32.2 | 38.7 | 32.4 |
| $\Sigma F_i$ | 341 | 310 | 296 | 298 | 343 | 298 |
| SP | 8.50 | 8.55 | 8.64 | 8.61 | 8.60 | 8.65 |

TABLE 7

|  | B7 | B8 | B9 | B10 | B11 |
|---|---|---|---|---|---|
| Density $\rho$ (g/cm$^3$) | 0.90 | 0.92 | 1.19 | 1.09 | 1.10 |
| Molecular weight M of repeating unit | 42.0 | 28.0 | 100 | 102.8 | 83.9 |
| $\Sigma F_i$ | 375 | 266 | 778 | 860 | 768 |
| SP | 8.04 | 8.74 | 9.26 | 9.12 | 10.07 |

What is claimed is:

1. A molded foam article comprising:
    a rubber-modified styrenic resin composition comprising:
        (A) 100 wt. parts of a rubber-modified styrenic resin which contains 10 to 35 wt. % of soft component particles having an average particle size of 0.1 to 0.5 $\mu$m, wherein said soft component particles have a single occlusion structure comprising a core part which consists of a single continuous phase of a styrenic resin and a shell part which comprises a rubber polymer and occludes said core part; and
        (B) 0.1 to 10 wt. parts of a polymer having a solubility parameter (SP) of 8.45 to 8.70 and having no aromatic vinyl compound unit therein.

2. The molded foam article according to claim 1, wherein said polymer (B) is a copolymer comprising ethylene and at least one vinyl monomer selected from the group consisting of unsaturated carboxylic acids, unsaturated carboxylates and vinyl acetate.

3. The molded foam article according to claim 1, wherein said polymer (B) is an ethylene-unsaturated carboxylate copolymer.

4. The molded foam article according to claim 1, wherein said polymer (B) is an ethylene-methyl methacrylate copolymer.

5. The molded foam article according to claim 1, wherein said polymer (B) is an ethylene-vinyl acetate copolymer.

6. The molded foam article according to claim 1, which further comprises 0.01 to 0.5 wt. parts of an organic polysiloxane per 100 wt. parts of said rubber-modified styrenic resin (A).

7. The molded foam article according to claim 6, wherein the organic polysiloxane is a compound of the following formula:

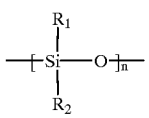

wherein $R_1$ and $R_2$ are the same or different and represent an alkyl group, an aryl group or a phenyl group; and n represents an average degree of polymerization and is a number of 10 to 1500.

8. The molded foam article according to claim 1, wherein said styrenic resin is obtained by polymerizing at least one styrenic monomer selected from styrene, alpha-methylstyrene and p-methylstyrene.

9. The molded foam article according to claim 1, wherein said styrenic resin is obtained by polymerizing at least one styrenic monomer selected from the group consisting of styrene, alpha-methylstyrene and p-methylstyrene; and a copolymerizable compound selected from the group consisting of acrylonitrile, methacrylonitrile, methacrylic acid, methyl methacrylate, maleic anhydride, and maleimide.

10. The molded foam article according to claim 1, wherein said rubber polymer is selected from the group consisting of polybutadiene, styrene-butadiene copolymer, and ethylene-propylene-non-conjugated diene terpolymer.

11. The molded foam article according to claim 1, wherein the soft component particles have an average particle size of 0.1 to 0.3 $\mu$m.

* * * * *